US 6,664,244 B1

(12) United States Patent
Furuse et al.

(10) Patent No.: US 6,664,244 B1
(45) Date of Patent: Dec. 16, 2003

(54) PET FOODS

(75) Inventors: Mitsuhiro Furuse, Koga (JP); Toshinori Sako, Tokyo (JP)

(73) Assignee: Nihon Shokuhin Kako Co., Ltd., Tokyo (JP)

( * ) Notice: Subject to any disclaimer, the term of this patent is extended or adjusted under 35 U.S.C. 154(b) by 0 days.

(21) Appl. No.: 09/821,465

(22) PCT Filed: Oct. 8, 1999

(86) PCT No.: PCT/JP99/05572

§ 371 (c)(1), (2), (4) Date: Oct. 3, 2001

(87) PCT Pub. No.: WO00/21382

PCT Pub. Date: Apr. 20, 2000

(30) Foreign Application Priority Data

Oct. 9, 1998 (JP) .......................................... 10-287745

(51) Int. Cl.$^7$ .............................................. A01N 43/04
(52) U.S. Cl. ...................... 514/58; 424/439; 424/442; 426/805
(58) Field of Search ................. 424/439, 442; 426/531, 805; 439/442; 514/54, 58

(56) References Cited

U.S. PATENT DOCUMENTS

| 5,217,734 A | | 6/1993 | Tanaka ............................ 426/2 |
| 5,756,088 A | * | 5/1998 | Matsuura et al. ............ 424/93.4 |
| 5,780,096 A | | 7/1998 | Tanaka ........................ 426/655 |
| 5,894,029 A | * | 4/1999 | Brown et al. ................ 426/302 |

FOREIGN PATENT DOCUMENTS

| DE | 41 36 325 A1 | | 5/1993 | |
| JP | 58 138345 | | 8/1983 | |
| JP | A-63-74455 | | 4/1988 | |
| JP | 63-074455 | * | 4/1988 | ............ A23K/1/18 |
| JP | A-4-11865 | | 1/1992 | |
| JP | 04-011865 A | * | 1/1992 | ............ A23L/1/30 |
| JP | A-6-217710 | | 8/1994 | |
| JP | 06-217710 | * | 8/1994 | ............ A23K/1/18 |

OTHER PUBLICATIONS

BIOSIS Online, BNSDOCID: <XP–002232833> 1993; LIPIDS, 28, 181–188 (1993).

R. Mori et al., "Effect of Cyclodextrins on Small Intestinal Mucosa and Glucosa Absorption in the Rat", vol. 17, No. 2, Jun. 2000, pp. 201–208.

* cited by examiner

*Primary Examiner*—Ralph Gitomer
(74) *Attorney, Agent, or Firm*—Jacobson Holman PLLC

(57) ABSTRACT

A pet food, such as a dog food and a cat food, contains a cyclodextrin such as β-cyclodextrin, for example, a pet food in which the content of fat is equal to or higher than 5% by weight per solid part and the content of β-cyclodextrin ranges from 1 to 15% by weight per solid part. A method of suppressing an increase in the body weight of a pet or reducing the body weight, is characterized by feeding the pet food to a pet to the extent that the ingested amount of β-cyclodextrin, per day, ranges from 0.1 to 5 g per 1 kg of body weight. A pet food is suited to a pet's liking because of having the same taste and mouth feel as conventional pet foods, and suppresses an increase in the body weight of a pet or reduces body weight with the same feeding amount as usual, and a method suppresses an increase in the body weight of a pet or reduces body weight without impairing the health of pets.

5 Claims, 2 Drawing Sheets

PET FOODS

This is a 371 of PCT/JP99/05572, filed Oct. 8, 1999, and published in Japanese which claims priority to 10/287745 Japanese Application filed Oct. 9, 1998.

TECHNICAL FIELD

The present invention relates to a pet food, more specifically, a pet food which is easily suited to a pet's liking because of having the same taste and mouth feel as conventional pet foods and which has a dieting effect. The present invention further relates to a method which suppresses an increase in the body weight of a pet or reduces the body weight of a pet by using the pet food of the present invention.

BACKGROUND ART

Recently, there area lot of cases where pets, for example, dogs and cats, are tenderly bred like part of the family and many kinds of pet foods which are suited to each animal are on the market. These pet foods are prepared taking into consideration nutritive values and the likings of pets. However, diseases such as obesity and diabetes have frequently occurred due to insufficient exercise and overeating, thereby causing serious problems to keepers.

Therefore, in order to suppress overeating, it has been a practice to reduce the feeding amount or to feed a pet food containing a dietary fiber in a prescribed amount. However, if the feeding amount is reduced, health may be impaired. In addition, the pet food containing the prescribed amount of dietary fiber is not suited to a pet's liking, so that the eaten amount is reduced, thereby, also causing impairment of health.

Therefore, an object of the present invention is to provide a novel pet food which is suited to a pet's liking because of having the same taste and mouth feel as conventional pet foods, and which can suppress an increase in the body weight of a pet or reduce the body weight of a pet with the same feeding amount as usual.

Further, an object of the present invention is to provide a method which can suppress an increase in the body weight of a pet or reduce the body weight of a pet without impairing the health of the pet.

A pet food with the aim of suppressing an increase in body weight or reducing body weight has not been known so far. For example, disclosed in Japanese Unexamined patent Publication (KOKAI) Heisei No.6-217,710 is a pet food with the aim of preventing and treating skin diseases of pets. In this publication, disclosed is cyclodextrin, which is used as a component of a pet food of the present invention as one of vehicles, as described below. However, in this publication, there is no mention that cyclodextrin is used for the purpose of suppressing an increase in body weight or reducing body weight.

In addition, the research on the influence of cyclodextrin on eating disorders of rats was reported (for example, Ryoichi Mori, Mitsuhiro Furuse, and Junichi Okumura, 1997, "Influence of cyclodextrin on membrane components and absorption functions of small intestine mucous membrane in rat", p.129, The 92nd meeting of Japanese Society of Animal Science). However, results obtained from the research on rats, which are omnivorous and have no gall as well as degrade cyclodextrin by fermentation in the large intestine, can not be applied to dogs or the like which are carnivorous and have no gall as well as cannot degrade cyclodextrin because their large intestine is not developed.

SUMMARY OF THE INVENTION

The present invention is a pet food comprising a cyclodextrin, preferably β-cyclodextrin.

In particular, the pet food of the present invention is a dog food or cat food, further it can be a jerky or an object food.

Further, the pet food of the present invention preferably comprises fat in an amount equal to or higher than 5% by weight per solid part, as well as β-cyclodextrin in an amount ranging from 1 to 15% by weight per solid part.

In addition, the present invention relates to a method which suppresses an increase in the body weight of a pet or reduces the body weight, characterized in that the aforementioned pet food of the present invention is fed to a pet. The present invention further relates to a method which suppresses an increase in the body weight of pets or reducing the body weight, characterized in that the pet food according to the invention is fed to a pet so as to ingest β-cyclodextrin in an amount per day ranging from 0.1 to 5 g per 1 kg of body weight.

BEST MODE FOR CARRYING OUT THE INVENTION

Figure 1:
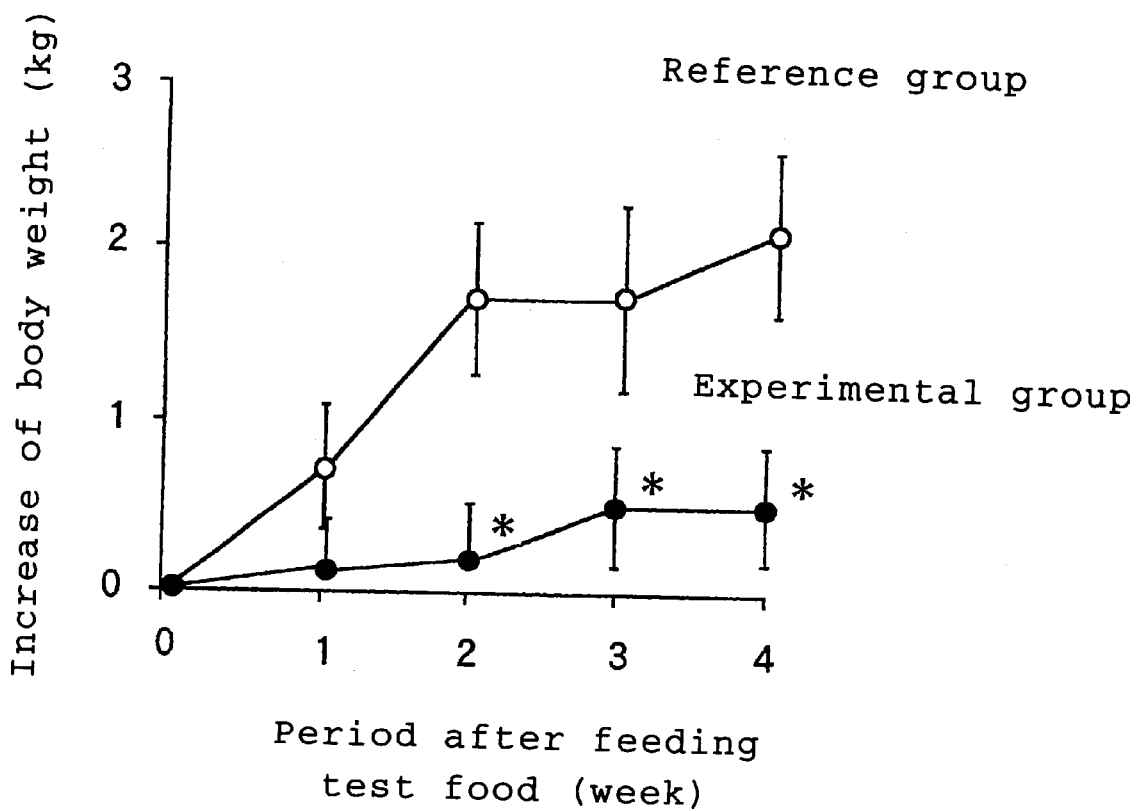
FIG. 1 illustrates the results of Example 1 (body weight change)

The pet food of the present invention contains a cyclodextrin. As for the cyclodextrin, publicly known ones can be used and preferred is β-cyclodextrin.

The pet food of the present invention can be a dog food for dogs or a cat food for cats, which particularly suffer from a lot of problems such as obesity. In addition, pet foods can be classified into a general food, which is fed as a normal meal, a jerky, which is fed as a snack, and food, which contains a specific component used for pets suffering from diseases (or in which the content of the specific component is limited) It is appropriate that the pet food of the present invention is the jerky or the object food.

It is generally mentioned that obesity is caused by snacks and feeding jerkies in an excessive amount. If pets cheerfully eat, their keepers tend to feed snacks exceeding the defined amount in spite of an instruction of the products (pet foods). Because the jerky which is the pet food of the present invention has the effect of suppressing an increase in body weight or reducing body weight, obesity is suppressed even if it is excessively eaten.

In addition, many object foods, which are used for the main purpose of diet, are not suited to a pet's liking so far, such as those containing a lot of plant fiber, so that the appetite of the pet is lowered, thereby the pet falls into ill health in some cases. However, because the object food which is the pet food of the present invention has the same taste and mouth feel as conventional pet foods, it is suited to a pet's liking. Further, it can be given a flavor utilizing the inclusion effect of cyclodextrin, if necessary.

The pet food of the present invention can contain proteins, fats, carbohydrates and fibers as well as inorganic substances such as calcium, phosphorus, sodium, potassium, magnesium and chloride.

Moreover, flavors which are included in cyclodextrin can be added to the pet food of the present invention. The flavors included in cyclodextrin are hardly deteriorated by heat, so that if added to jerkies which are subjected to heat-treatment during molding or object foods which are subjected to heat-treatment for sterilization, deterioration of flavors can be suppressed.

In particular, if the pet food of the present invention is a dog food or a cat food, it is preferable that the content of fat is equal to or higher than 5% by weight per solid part, preferably from 10 to 30% by weight, as well as the content of β-cyclodextrin ranging from 1 to 15% by weight per solid part, preferably from 2 to 10% by weight. Dogs and cats like fat since they are carnivorous, and fat causes obesity, but it is possible to prevent obesity by incorporating β-cyclodextrin in the diet even if the pet is fed a pet food containing relatively large amount of fat.

The pet food of the present invention is fed in an appropriate amount taking into consideration whether the pet is in or after the growing stage, the health condition and necessity of reducing the body weight of the pet, and components contained in the pet food of the present invention other than cyclodextrin. If the feeding amount per 1 kg of body weight is the same, an increase in body weight may be suppressed in one case, or the body weight is reduced in the other case depending on the condition of pets, the other components in the pet food and the content thereof. It is appropriate that the pet food of the present invention is divided in 1 to 3 portions per day and then fed to the extent that the ingested amount ranges from 0.1 to 5 g, preferably from 0.3 to 2.5 g per 1 kg of body weight in the case of β-cyclidextrin, taking into consideration that the object of using the present invention is either prevention of obesity (the increase of body weight) without the necessity of reducing body weight or reducing body weight.

The method of the present invention is a method by which an increase in the body weight of a pet is suppressed or the body weight is reduced, characterized in that the aforementioned pet food of the present invention is fed to the pet. As described above, even if cyclodextrin is fed in the same amount per 1 kg of body weight, an increase in body weight of the pet may be suppressed in one case, or the body weight is reduced in another case, depending on the condition of the pet and the other components in the pet food. Therefore, in the method of the present invention, it is appropriate that the pet food of the present invention is divided in 1 to 3 portions per day and then fed to the extent that the ingested amount ranges from 0.1 to 5 g, preferably from 0.3 to 2.5 g per 1 kg of body weight in the case of β-cyclodextrin, taking into consideration whether suppressing the increase of body weight of the pet is the aim or reducing the body weight of the pet is the aim.

EXAMPLES

The present invention will be further described in the following examples.

Example 1

(Experiments on Suppression of Obesity)

Ten healthy beagles were divided in 2 groups consisting of 5, respectively. Hills c/d Dry were fed for 1 week before the experiment. As for feeds in this experiment, the one in which 200 g of Hills c/d Dry blended with 117 g of lard was used as a basic feed. In the reference group, the one in which 34 g of cornstarch was added to the above basic feed is used. In the experimental group, the feed used is the same one as used in the reference group except that all corn starch was replaced with 23.4 g of β-CD (β-cyclodextrin). The feeding amount for one dog, per day, was controlled without changing the ratio of components so that the amount of the basic feed (Hills c/d Dry and lard) is about 400 kcal per metabolic body weight (kg0.75)

Results are shown in FIG. 1. In FIG. 1, * means that each value is significantly lower than that of the reference group. As seen from the results in FIG. 1, for beagles fed with a pet food containing β-CD, increase of body weight is significantly suppressed.

It is to be noted that Hills c/d Dry has the following composition (%);

| Protein | 20.20 |
| Fat | 19.50 |
| Carbohydrate | 46.20 |
| Fibers | 2.80 |
| Calcium | 0.60 |
| Phosphorus | 0.45 |
| Sodium | 0.26 |
| Potassium | 0.43 |
| Magnesium | 0.10 |
| Chloride | 0.44 |
| Metabolic energy | (4.24 kcal/g) |

Example 2

(Experiments on Solution of Obesity)

Ten beagles were fed high-energy foods for 2 months before the experiment, so that they became obese. At the beginning of the experiment, they were divided in four groups so as to make uniform the average body weight of each group as much as possible. The feed used in the reference group was the same as that of Experiment 1 and the same feed in which 23.4 g of corn starch was replaced with β-CD was used in the β-CD group. The feeding amount for one dog, per day was controlled without changing the ratio of components so that the amount of the basic feed (Hills c/d Dry and lard) is about 275 kcal per metabolic body weight (kg0.75).

Figure 2:
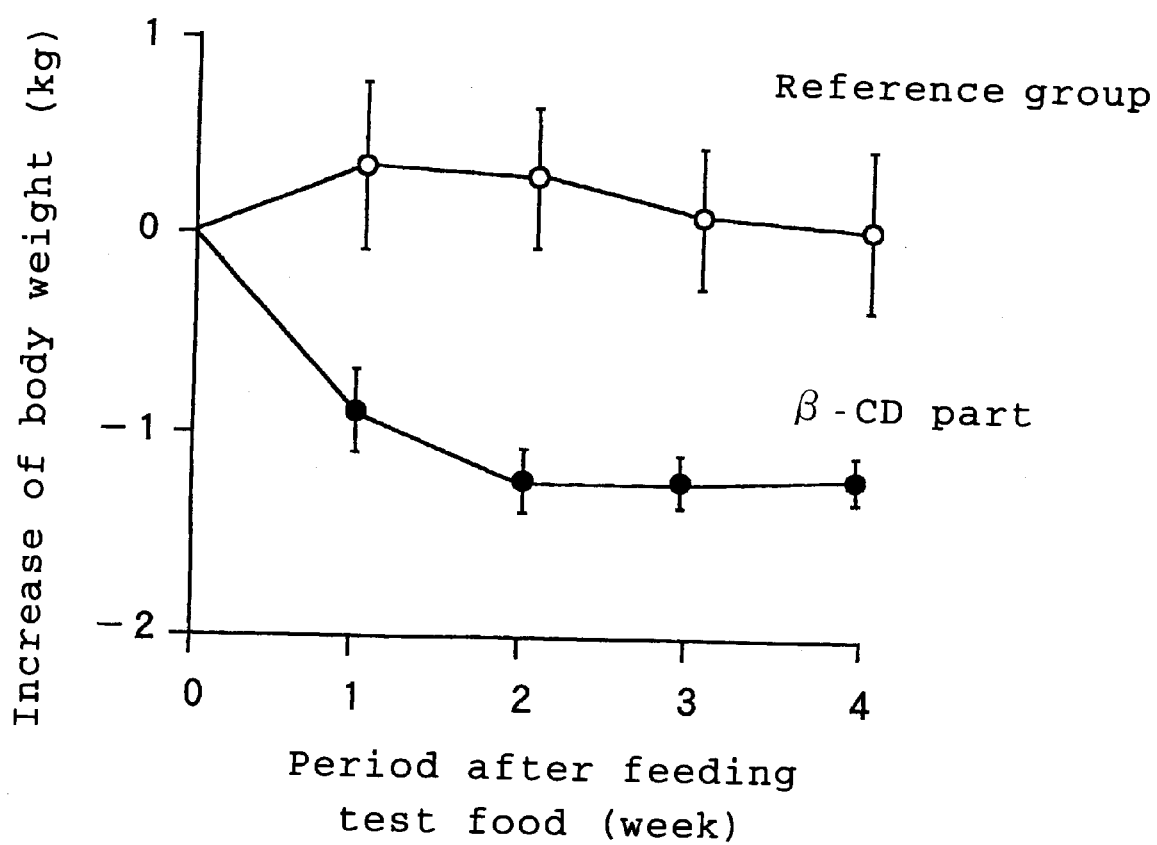
FIG. 2 illustrates the results of Example 2 (body weight change).

Results are shown in FIG. 2. As seen from the results in FIG. 2, for beagles fed the pet food containing β-CD, body weight is significantly reduced.

Industrial Applicability

According to the present invention, it is possible to provide a novel pet food which is suited to a pet's liking because of having the same taste and mouth feel as conventional pet foods, and which can suppress an increase the body weight of a pet or reduce the body weight with the same feeding amount as usual.

Further, according to the present invention, it is possible to provide a method which can suppress an increase in the body weight of a pet or reduce the body weight without impairing the health of pets.

What is claimed is:

1. A method of suppressing an increase in body weight of a pet or reducing the body weight, comprising the step of feeding pet food containing β-cyclodextrin to a pet, to the extent that an ingested amount of β-cyclodextrin per day ranges from 0.1 to 5 g per 1 kg of body weight.

2. The method according to claim 1, wherein the pet food containing β-cyclodextrin is fed to the extent that an ingested amount of β-cyclodextrin per day ranges from 0.3 to 2.5 g per 1 kg of body weight.

3. The method according to claim 1 wherein the pet food containing β-cyclodextrin has a content of fat equal to or higher than 5% by weight per solid part and a content of β-cyclodextrin ranging from 1 to 15% by weight per solid part.

4. The method according to claim 1 wherein the said pet food containing β-cyclodextrin has a content of fat ranging from 10 to 30% by weight per solid part and a content of β-cyclodextrin ranging from 1 to 15% by weight per solid part.

5. The method according to claim 1, wherein the pet food containing β-cyclodextrin has a content of fat ranging from 10 to 30% by weight per solid part and a content of β-cyclodextrin ranging from 2 to 10% by weight per solid part.

* * * * *